UNITED STATES PATENT OFFICE.

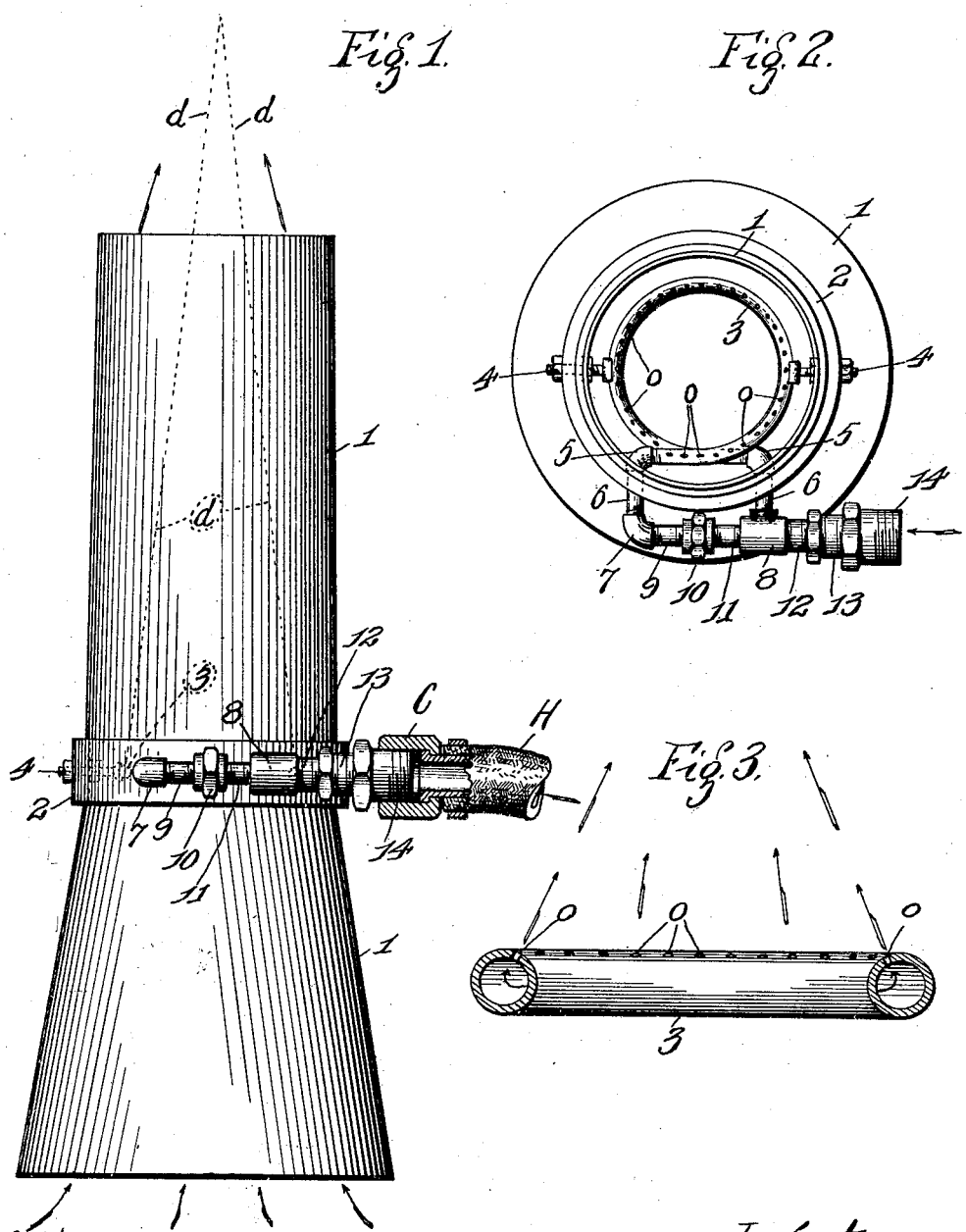

ARTHUR L. HAWKESWORTH, OF BUTTE, MONTANA.

VENTILATOR.

1,318,750.　　　　Specification of Letters Patent.　　Patented Oct. 14, 1919.

Application filed June 26, 1918. Serial No. 241,976.

*To all whom it may concern:*

Be it known that I, ARTHUR L. HAWKESWORTH, a citizen of the United States, residing at Butte, in the county of Silverbow and State of Montana, have invented certain new and useful Improvements in Ventilators, of which the following is a full, clear, and exact description, reference being had to the accompanying drawings, forming a part hereof.

The present invention is directed to improvements in ventilators, and particularly those of the ejector type or that wherein a circulation of atmospheric air is produced by the action of air jets projected under considerable pressure through a pipe or conduit and in such manner as to not only induce a flow of large quantities of outside air and gases into said pipe or conduit through one end thereof but to cause a corresponding expulsion of said air and gases through the opposite end of the pipe, thereby bringing about a general circulation of air in the neighborhood of the pipe and hence a corresponding ventilation in places where the device may be employed, such as tunnels, drifts, shafts and the like having at some point communication with the outside air. The device operates as a powerful blower with the added advantage however of producing a more positive movement of the air to effect a thorough ventilation of the surrounding space and expel the vitiated air and gases therefrom. The advantages of the invention will more fully appear from the following detailed description in connection with the accompanying drawing in which—

Figure 1 represents an elevation of the ejector; Fig. 2 is an end view thereof; and Fig. 3 is a cross-section of the jet pipe on a large scale showing the inclination of the discharge openings.

Referring to the drawings, 1 represents a pipe or conduit having an outwardly flaring intake portion and a reduced, slightly outwardly tapering discharge portion, a stiffening band 2 surrounding the base of the reduced portion. Supported inside the conduit 1 opposite the band 2 and concentric with the conduit is a circular jet pipe 3, suitable clamp bolts 4, 4, passed through the band 2 and walls of the conduit being employed for securing said jet pipe in position, the terminals of the pipe overlapping as shown (Fig. 2) and the ends secured to the elbows 5, which in turn are coupled to nipples or short pipes 6 passed through the conduit walls and band 2 and extending at right angles to the clamp bolts 4. The outer terminals of the nipples 6 are coupled to the elbow 7 and T 8 respectively, the elbow 7 being secured to the adjacent end of a nipple 9 leading from a union 10 connecting said nipple with a corresponding nipple 11 leading from the adjacent end of the T 8. The opposite end of the T has coupled thereto a nipple 12 carrying a reducer 13 which is received by the hose connection 14, a suitable hose H terminating in a coupling C being adapted to be secured to the member 14. The jet pipe 3 is formed with peripheral openings *o* whose axes are disposed along lines converging to a point beyond the discharge end of the conduit 1, the paths of the jets issuing from said openings being indicated by the lines *d* which represent the prolongations of said axes. These paths it will be seen are at an angle to the axis of the conduit 1.

In ventilating a mine drift for example, the ejector is suitably positioned in the end of the drift and air say under ninety (90) pounds pressure is delivered by the hose H (from any suitable supply source not shown) into the jet pipe 3, the air jets or streams being forcibly projected toward the discharge end of the conduit 1 along the lines *d* converging to a point beyond the conduit, the powerful ejecting cone of air thus formed drawing in large volumes of air from the drift through the intake end of the conduit and expelling it through the discharge end, and thereby setting up a vigorous circulation and thoroughly ventilating the drift.

I may of course substitute steam for compressed air as the driving medium, the jet pipe 3 being adapted to operate with steam as well as compressed air. The ejector too may be employed in other connections, being useful in renewing or drawing out bad or foul air from any place whatever and not necessarily restricted in its application to ventilating mines. Operating as a blower, the device may be employed for a variety of purposes not herein referred to.

As to the details of the apparatus, it is apparent that these may be changed in many particulars appealing to the skilled mechanic without involving a departure from the nature or spirit of the invention. For example, the jet pipe 3 is herein shown as a bent pipe, the ends whereof overlap and point in opposite directions, the terminals of these ends being in turn coupled by means of nipples passed through the walls of the conduit with pipes leading to a suitable source of compressed air supply. I may however substitute any equivalent hollow member having a passage-way substantially concentric with the cross-section of the conduit, into which air or other fluid under pressure may be delivered, and provide said hollow member with ports or openings discharging in streams at an angle to, and converging toward the axis of the conduit. I may provide other means of supporting the jet pipe, not necessarily restricting myself to the clamp-bolts here shown. The jet pipe should of course be spaced from the inner walls of the conduit so as to allow outside air and gases to be drawn through the conduit by the driving hollow air cone both around and into the said cone, thereby insuring a flow or movement of a maximum volume of such air and gases.

Having described my invention what I claim is:

An ejector of the character described comprising an open ended conduit having an outwardly flaring intake portion and an outwardly tapering eduction portion, a jet pipe bent into annular form and mounted in the conduit at the base of the eduction portion and spaced at a substantially uniform distance from the inner walls of the conduit, the ends of the jet pipe overlapping and pointing in opposite directions, suitable pipe connections leading from the ends of the jet pipe through the walls of the conduit, pipes connecting the pipe connections aforesaid with a suitable source of compressed air supply, the jet pipe being provided with openings discharging toward the outlet end of the conduit along lines converging to a point beyond said outlet end.

In testimony whereof I affix my signature in presence of two witnesses.

ARTHUR L. HAWKESWORTH.

Witnesses:
MIKE S. SULLIVAN,
F. C. JACCORD.

Copies of this patent may be obtained for five cents each, by addressing the "Commissioner of Patents Washington, D. C."